United States Patent Office 3,591,643
Patented July 6, 1971

3,591,643
PROCESS FOR THE PREPARATION OF BICYCLO HEXANE COMPOUNDS AND THE NOVEL COMPOUND DEMETHYL-CIS-SABINENE HYDRATE
Wayne Irwin Fanta and William Francis Erman, Springfield Township, Ohio, assignors to The Procter & Gamble Company, Cincinnati, Ohio
No Drawing. Filed Feb. 28, 1968, Ser. No. 708,780
Int. Cl. C07c 35/22; C11b 9/00; A23l 1/26
U.S. Cl. 260—617F
2 Claims

ABSTRACT OF THE DISCLOSURE

Novel process for the preparation of demethyl-cis-sabinene hydrate comprising the steps of (1) cyclizing 2-methyl-3,6-heptane-dione with a base in a suitable solvent to form 3-isopropyl-2-cyclopentenone; (2) reducing the 3-isopropyl-2-cyclopentenone with a suitable reducing agent to obtain 3-isopropyl-2-cyclopentenol; and (3) reacting the 3-isopropyl-2-cyclopentenol with appropriate reagents to form the novel compound demethyl-cis-sabinene hydrate. Sabina ketone, sabinene and cis- and trans-sabinene hydrates can readily be prepared from the demethyl-cis-sabinene hydrate, if desired.

BACKGROUND OF THE INVENTION

This invention relates to a process for the production of bicyclo[3.1.0]hexane compounds. More particularly, the present invention relates to a process for the production of demethyl-cis-sabinene hydrate, sabina ketone, sabinene, cis-sabinene hydrate, an trans-sabinene hydrate which are valuable compounds for reconstituting a large number of essential oils, including lavender, lavendin, spearmint, and savin. These and other oils which can be reconstituted utilizing the compounds derived from the process and the compound of the present invention provide highly valuable perfume and flavor bases. Specifically, this invention relates to a process utilizing 2-methyl-3,6-heptane-dione as a starting reactant to afford a complete synthesis of the desired bicyclo [3.1.0]hexane compounds. Additionally, this invention relates to a novel compound, i.e., demethyl-cis-sabinene hydrate which, in addition to its use as an aid in the formulation of perfume and flavor bases, is a valuable intermediate in the process of the present invention to produce other bicyclo[3.1.0]hexane compounds.

Several general methods of obtaining bicyclo[3.1.0] hexane compounds from naturally occurring sources are available in the prior art. However, despite the frequent occurrence of such compounds in essential oils and perfume bases, synthetic approaches to these naturally occurring substances have received little or no attention in the prior art. These compounds have usually been obtained by various extraction methods from essential oils or by conversion of one naturally occurring compound to another such compound. For example, J. W. Daly et al., J. Am. Chem. Soc., 80, 6330 (1958) discuss the synthesis of cis- and trans-sabinene hydrates from naturally occurring sabinene. The process of the present invention involves a total synthesis of these desired compounds. Such a total synthesis is desirable due to the difficulty in obtaining the naturally occurring bicyclo[3.1.0]hexane compounds.

It is, therefore, an object of the present invention to provide a novel process for the production of bicyclo [3.1.0]hexane compounds.

It is a further object of the present invention to provide a novel process for the production of bicyclo[3.1.0] hexane compounds from 2-methyl-3,6-heptanedione.

It is a still further object of the present invention to provide the novel compound demethyl-cis-sabinene hydrate.

Other objects and advantages of the present invention will be readily apparent to one skilled in the art from the following description.

SUMMARY OF THE INVENTION

These objects are achieved by the present invention which is directed towards a process comprising the steps of:

(1) cyclizing 2 - methyl-3,6-heptanedione having the structure:

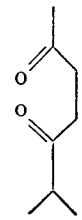

with a base in water or another suitable solvent to obtain 3-isopropyl2-cyclopentenone having the structure:

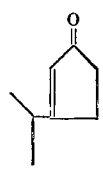

(2) reducing the 3-isopropyl-2-cyclopentenone with a compound selected from the group consisting of lithium aluminum hydride, sodium borohydride, lithium borohydride and a lithium aluminum hydride-aluminum chloride mixture to obtain 3-isopropyl-2-cyclopentenonl having the structure:

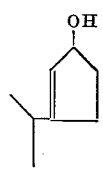

and (3) reacting the 3 - isopropyl - 2-cyclopentenol with methylene iodide and a compound selected from the group consisting of a zinc -copper couple and a dialkyl zinc compound to obtain the novel compound demethyl-cis-sabinene hydrate having the structure:

It is a preferred embodiment of the present invention to oxidize the demethyl-cis-sabinene hydrate with a compound selected from the group consisting of chromium trioxide, manganese dioxide, and a chromium trioxide-pyridine complex to obtain sabina ketone having the structure:

Sabina ketone can be reacted with methyltriphenylphosphonium bromide in the presence of a strong base to obtain sabinene having the structure:

Sabina ketone can also be reacted with a compound selected from the group consisting of methyl Grignards and methyl metallics and subsequently treating the reaction product with water to obtain a mixture of cis-sabinene hydrate having the structure:

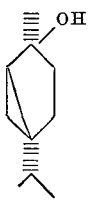

and trans-sabinene hydrate having the structure:

Thus, the reaction described above proceeds as follows:

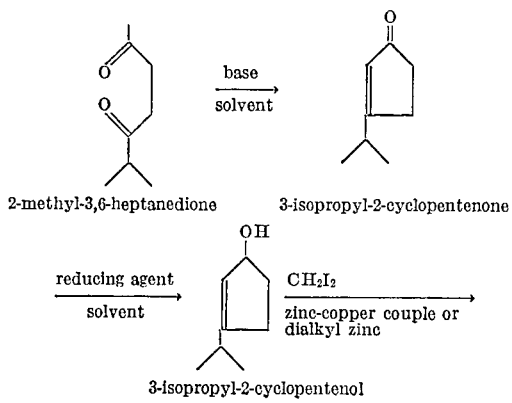

[Figure: demethyl-cis-sabinene hydrate → sabina ketone (oxidizing agent); 1) methyl Grignard or methyl metallic 2) H₂O; methyltriphenylphosphonium bromide base; giving cis-sabinene hydrate + trans-sabinene hydrate, and sabinene]

The novel compound demethyl-cis-sabinene hydrate is also an integral part of this invention. This novel compound has immediate utility as a perfume and flavor additive, as a compound in the reconstitution of certain essential oils and as an intermediate in the synthesis of sabina ketone from which sabinene, cis-sabinene hydrate and trans-sabinene hydrate can be prepared, all as is fully disclosed and exemplified hereinafter.

The initial reactant employed in the process of the present invention, 2-methyl-3,6-heptanedione, is known and can be obtained by several different methods. One method, as generally described by H. C. Brown, Hydroboration, W. A. Benjamin, Inc., New York (1962), comprises treating 2-methyl-2-hepten-6-one with diborane (diboron hexahydride) in a solvent, for example, tetrahydrofuran, to obtain an intermediate alkyl boron compound. This material is not isolated but it is treated with a base and hydrogen peroxide and subsequently, in a separate step, is oxidized to 2-methyl-3,6-heptanedione. This product is isolated from a brine solution by ether extraction.

Another method of obtaining 2-methyl-3,6-heptanedione is a modified procedure of that described in K. V. Auwers et al., Ber., 48, 1357 (1915), Chem. Abstr., 9, 3236 (1915), utilizing α-terpinene. Ozonolysis of α-terpinene in a methanol solvent and subsequent treatment with sodium iodide and acetic acid yields the desired reactant.

The first step of the process of the present invention comprises cyclizing 2-methyl-3,6-heptanedione with a base in the presence of a suitable solvent. Preferred bases for this reaction are sodium hydroxide and potassium hydroxide. Other suitable bases are described in H. O. House, Modern Synthetic Reactions, W. A. Benjamin, Inc., New York (1965), page 185. The molar ratio of the 2-methyl-3,6-heptanedione to the base should be from about 1:2 to about 5:1, preferably about 1:1.5 to 1:1, to insure completeness of the reaction. Solvents commonly utlized with these bases include water, water and short-chain alcohol mixtures wherein the alcohol contains from about 1 to about 6 carbon atoms and others as described in H. O. House, Modern Synthetic Reactions, supra, page 185 (incorporated herein by reference). The quantity of solvent utilized is not critical; the preferred solvent depends on the particular base selected. Appropriate bases and solvents as listed by House (above) include: potassium t-butoxide, sodium 2-hydroxy-2-methyl butane, sodium amide, potassium amide, lithium diethyl amide, sodium hydride, lithium hydride; the sodium salt of the dimethyl sulfoxide carbanion, lithium triphenylmethylide, sodium triphenylmethylide, potassium triphenylmethylide, and sodium naphthide in solvents such as diethyl ether, benzene, 1,2-dimethoxyethane, toluene, liquid ammonia, dimethyl sulfoxide, tetrahydrofuran, t-butanol and dimethylformamide. Preferred combinations of base and solvent are sodium hydroxide and ethanol and potassium hydroxide and a water-methanol mixture containing from about 15% to about 50% methanol.

The reaction mixture comprising 2-methyl-3,6-heptanedione, the selected base, and the selected solvent, is heated to a temperature in the range of 35° C. to 125° C., preferably to reflux (e.g., about 80° C. for a water-ethanol solvent mixture), under an inert atmosphere (e.g., nitrogen), for about 1 to about 8 hours, preferably about 5 hours. If shorter periods of reflux are utilized, an incomplete conversion might occur and longer periods offer no particular advantages. Higher boiling solvent-base systems, for example, a tert-butyl alcohol-potassium tert-butoxide system need not be heated at reflux. The resulting mixture contains predominantly 3-isopropyl-2-cyclopentenone and a salt. Isolation by ether extraction from a brine solution and subsequent removal of the dried solvent, for example, by distillation by reduced pressure, yields the desired 3-isopropyl-2-cyclopentenone. It is desirable to then further purify the 3-isopropyl-2-cyclopentenone by subsequent distillation under reduced pressure.

It is preferred in the above-described reaction to maintain a nitrogen atmosphere by apparatus similar to that described by Johnson et al., Org. Syn., 30, 18 (1950).

The second step of the present invention comprises reducing the 3-isopropyl-2-cyclopentenone with a reducing agent selected from the group consisting of lithium aluminum hydride, sodium borohydride, lithium borohydride and a lithium aluminum hydride-aluminum chloride mixture, in the presence of a solvent which is chosen according to the reducing agent selected. A preferred reducing agent is lithium aluminum hydride. The reducing agent must be selected from the above class in order to reduce the ketone group of the 2-isopropyl-3-cyclopentenone without reducing the carbon-carbon double bond of the 5 member ring. The molar ratio of the 3-isopropyl-2-cyclopentenone to the reducing agent should be from about 4:1 to about 1:1, preferably about 2:1, in order to achieve the desired results of the present invention. When lithium aluminum hydride or a lithium aluminum hydride-aluminum chloride mixture with a molar ratio of about 0.9:1 to about 1:09, preferably 1:1, is utilized as the reducing agent, the solvent can be diethyl ether, tetrahydrofuran or 1,2-dimethoxyethane. The resulting mixture is stirred at temperatures in the range of from about −10° C. to about 40° C. for from about 1 to about 6 hours depending on the reducing agent and solvent system employed. A temperature of about 25° C. and a reaction period of about 3 hours are preferred. The resulting mixture can then be decomposed by the dropwise addition of a calculated amount of water and sodium hydroxide, (1 ml. water and 0.8 ml. sodium hydroxide per 0.5 grams reducing agent). The use of such calculated amounts of water allows the salt which is formed to act as a drying agent and eliminates the necessity of having a separate drying or extracting step. The careful dropwise addition is desirable due to the vigorous reactions that occur with the reducing agents useful in the present invention. The resulting mixture is then filtered and the solvent removed, for example, by distillation, preferably under reduced pressure, and a purification yields 3-isopropyl-2-cyclopentenol. If sodium borohydride or lithium borohydride is the reducing agent utilized, then the solvent should be water or a water-methanol mixture. The resulting mixture is stirred as above and the desired 3-isopropyl-2-cyclopentenol can be isolated by extraction.

The third step of the process of the present invention comprises reacting 3-isopropyl-2-cyclopentenol in an inert atmosphere, e.g. nitrogen, with a mixture of methylene iodide and a zinc-copper couple or a dialkyl zinc compound, wherein the alkyl groups contain from 1 to about 4 carbon atoms and may be identical, e.g., diethyl zinc. This is an adaptation of the procedure outlined by Duben et al., J. Am. Chem. Soc., 85, 468 (1963). The mixture of methylene iodide and zinc-copper couple or dialkyl zinc compound in an ether solution, for example, diethyl ether, is preferably heated at from about 30° C. to about 50° C. for from about 30 minutes to about 120 minutes, preferably about 40 minutes. If one heats for a shorter period of time an incomplete conversion to the desired active intermediate is achieved and heating for a longer period offers no decided advantages. The molar ratio of methylene iodide to the zinc-copper couple or dialkyl zinc compound should be from about 1:1.5 to about 1:1, preferably from about 1:1.2 to about 1:1. The 3-isopropyl-2-cyclopentenol in an ether solvent, for example, diethyl ether, is preferably then added dropwise to the mixture of methylene iodide and zinc-copper couple or dialkyl zinc compound. Initially, this is an exothermic reaction but subsequently heat must be added to maintain the reaction at reflux. A period of reflux of about ½ hour to about 3 hours is utilized to effect a complete reaction. After cooling, the mixture can be treated with ammonium chloride to hydrolize the salts of the reaction product formed. The reaction product can then be filtered and the filtrate can be washed to neutrality with, for example, 10% sodium carbonate in water, and after drying by any well-known drying method, for example, magnesium sulfate, the solvent can be removed by distillation leaving the novel compound, demethyl-cis-sabinene hydrate. This compound can be further purified by distillation at reduced pressure, if desired.

It is essential that the ketone form, i.e., 3-isopropyl-2-cyclopentenone, be reduced to the alcohol form, i.e., 3-isopropyl-2-cyclopentenol, prior to the treatment with methylene iodide and the zinc-copper couple or dialkyl zinc compound or the reaction will not yield the novel desired compound, demethyl-cis-sabinene hydrate. Although applicants do not intend that this invention be bound by such explanation, it is believed that the hydroxyl group participates in a necessary intermediate step of the reaction. As a consequence of this step, a structure is formed with the cyclopropyl ring and the hydroxyl group on the same side of the cyclopentane ring and this accounts for the formation of demethyl-cis-sabinene hydrate rather than demethyl-trans-sabinene hydrate.

The novel compound, demethyl-cis-sabinene hydrate, prepared by the process of the present invention, has a desirable and useful odor characterized as dry, woody and camphoraceous. This compound can be used individually as an odorant per se, or it can be used as a component of perfume compositions for ultimate use in products such as soaps, detergents, deodorants, dentrifices and the like. This compound can also be used as a component in flavor compositions for ultimate use in products such as dentifrices and the like. This compound is also a necessary intermediate in the process of the present invention to produce other bicyclo[3.1.0]hexane compounds, i.e., sabina ketone, sabinene, cis-sabinene hydrate and trans-sabinene hydrate, which also have desirable odorant and/or flavorant properties.

If desired, demethyl-cis-sabinene hydrate can be treated with an oxidizing agent selected from the group consisting of chromium trioxide, manganese dioxide and a chromium trioxide-pyridine complex (Sarett reagent) in a solvent selected from the group consisting of acetic anhydride, tert-butyl alcohol, acetic acid, acetone, benzene, methylene chloride, ether, and pentane. The preferred oxidizing agent is chromium trioxide. This mixture is preferably maintained at from about −10° to about 50° C., preferably about 30° C., for from about 10 minutes to about 30 minutes, preferably about 15 minutes, and a crude product is formed. This crude product can be isolated by extraction from a brine solution and after washing and subsequently drying the solution with a suitable drying agent, for example, magnesium sulfate, the solvent can be removed by distillation leaving crude sabina ketone. This crude sabina ketone can be further purified by distillation at reduced pressure.

The molar ratio of demethyl-cis-sabinene hydrate to the oxidizing agent is preferably from about 1:1.5 to about 1:0.9, more preferably about 1:1. The use of less oxidizing agent results in an incomplete oxidation whereas the use of an excess of oxidizing agent offers no advantages to the reaction. The reaction time depends upon the reactants utilized, for example, when a standard chromium trioxide solution prepared according to the procedure of K. Bowden et al., J. Chem. Soc., 39, (1946) and an acetone solvent is utilized, the reaction time is about 15 minutes whereas when manganese dioxide and a pentane solvent is utilized a reaction time of about 2 to about 3 days is necessary for completion.

If sabinene is the desired product, sabina ketone can be converted to sabinene according to the following process. A solution of a base, e.g., sodium hydride, and a suitable solvent, e.g., dimethyl sulfoxide, as selected from H. O. House, Modern Synthetic Reactions, supra, page 185, is added to methyltriphenyl phosphonium bromide and the resulting mixture is stirred at room temperature in an inert atmosphere, e.g., nitrogen, for from about 15 minutes to about 60 minutes, preferably about 40 minutes, to insure complete formation of methylenetriphenylphosphorane. The molar ratio of the base to methyltriphenylphosphonium bromide is from about 1.2:1 to about 1:1.2 with a preferred ratio of about 1:1. If excess base is utilized, no particular advantages are gained and if less base is utilized, then complete formation of the methylenetriphenylphosphorane is not achieved.

A solution of sabina ketone and the same solvent as utilized with the base, e.g., dimethyl sulfoxide, is added to the solution of the methylenetriphenylphosphorane formed above and stirred at a temperature of from about 0° C. to about 50° C. preferably about 30° C., for from about 1 to about 8 hours, preferably about 3 hours, to insure completeness of the reaction. The molar ratio of the methylenetriphenylphosphorane to the sabina ketone is from about 10:1 to about 1:1, preferably about 5:1 in order to facilitate a reasonably rapid reaction under the prescribed conditions. The resulting mixture is subsequently added to water and is isolated with pentane and is dried by a standard drying method, e.g., magnesium sulfate. The remaining solvent is removed by distillation and the impure sabinene which remains is then further purified by liquid column chromatography and subsequent distillations.

If cis-sabinene hydrate and trans-sabinene hydrate are the desired products, sabina ketone can be converted to these compounds according to the following procedure. Under an inert, e.g., nitrogen, atmosphere, a solution of sabina ketone in an ether solvent, e.g., diethyl ether, tetrahydrofuran, dioxane, or 1,2-dimethoxyethane, is added to a solution of a compound selected from the group consisting of methyl Grignards and methyl metallics and the same solvent used with sabina ketone. The methyl Grignards which are useful in the present invention invention include methyl magnesium chloride, methyl magnesium bromide, and methyl magnesium iodide, and the methyl metallics which are useful in the present invention include methyl sodium, methyl potassium and methyl lithium. The ratio of sabina ketone to the methyl Grignard or methyl metallic is from about 1:5 to about 1:1, preferably about 1:3, in order to insure completeness of the reaction. If a low boiling point solvent is used (e.g., diethyl ether), the mixture is heated to a temperature in the range of about 35° C. to about 125° C., preferably to reflux and cooled and the product is isolated from a brine solution by an ether extraction and is subsequently dried utilizing a drying agent, for example, magnesium sulfate. The reflux period is from about 15 minutes to about 120 minutes, preferably about 60 minutes. If shorter times are utilized an incomplete reaction will result and longer periods of time offer no increase in the yield and may result in product decomposition. If a higher boiling point solvent, for example, dioxane, is utilized the reaction need not be heated at reflux and the product is simply isolated from a brine solution by an ether extraction, and is dried utilizing a drying agent, for example, magnesium sulfate. A subsequent removal of the solvent by distillation leaves a mixture of cis-and trans-sabinene hydrates. The ratio of the cis-sabinene hydrate to the trans-sabinene hydrate is from about 9:1 to about 4:1, usually about 8.5:1.

Sabina ketone, sabinene, cis-sabinene hydrate and trans-sabinene hydrate can be used individually or in admixture with each other as odorants per se, or as components of perfume and flavor compositions for ultimate use in products such as soaps, detergents, deodorants, dentifrice, and the like. Perfume compositions containing odoriferously effective amounts, for example, .0001% to about 50% of any of the above-described perfume components are desirable and useful. Flavor compositions containing from about .0001% to about 10% of any of the above-described flavor components are equally desirable and useful.

This invention comprises not only the process for the production of the novel compound demethyl-cis-sabinene hydrate but also the complete synthesis for the production of any of the other bicyclo[3.1.0]hexane compounds as described above.

The following examples will illustrate in detail the manner in which the invention can be practiced. It will be understood, however, that the invention is not confied to the specific limitations set forth in the individual examples, but rather to the scope of the appended claims.

PREFERRED EMBODIMENTS

Data listed in all of the examples were obtained by means of the following techniques unless otherwise indicated. Infrared spectra were determined on a Perkin-Elmer Model 137 Spectrophotometer; ultraviolet spectra were determined in ethanol on a Perkin-Elmer Model 202 Spectrophotometer. Nuclear magnetic resonance (n.m.r.) spectra were determined in carbon tetrachloride with a Varian Model HA-100 Spectrometer with chemical shifts measured relative to tetramethylsilane (10$\tau$). The n.m.r. data are noted by position, integration, multiplicity, coupling constant (in Hz), and assignment. Gas-liquid chromatography was accomplished with an Aerograph Model 202B using a flow rate of 100 ml./min. on 5-ft. by 0.25-in. columns packed with 20% FFAP (Carbowax 20M terminated with nitroterephthalic acid) on 60/80 mesh Chromosorb P.

EXAMPLE I

A dry, 2-liter flask fitted with an addition funnel and nitrogen inlet was charged with a solution of 51.6 g. of 2-methyl-3, 6-heptanedione in 580 ml. of 2% aqueous sodium hydroxide and 180 ml. of ethanol. A nitrogen atmosphere was introduced and the mixture was heated under reflux with good mechanical stirring for 4.5 hours. The reaction was diluted with a brine solution and the product was isolated with ether. Removal of the magnesium sulfate dried solvent and distillation afforded 32.18 g. of a faint green product which was purified by distillation. Comparison of the physical constants and infrared and nuclear magnetic resonance spectra of this material with published results positively identified it as 3-isopropyl-2-cyclopentenone.

A 1-liter flask fitted with a mechanical stirrer, condenser, and addition funnel was charged with a slurry of 5.0 g. of lithium aluminum hydride in 500 ml. of ether. The flask was cooled in an ice bath and a solution of 32.18 g. of 3-isopropyl-2-cyclopentenone in 100 ml. of diethyl ether was added with good stirring over 15 minutes. The resulting mixture was stirred 2 hours at room temperature and was decomposed by the cautious addition of 10 ml. of water and 8 ml. of 10% aqueous sodium hydroxide. After stirring overnight, the reaction was filtered and the solvent was removed to afford 31.8 g. of product. After further purification by distillation, analysis of said product via gas chromatography, and nuclear magnetic resonance and infrared spectra positively identified it as 3-isopropyl-2-cyclopentenol.

A 250-ml. flask fitted with a mechanical stirrer, condenser, and septum cap was charged with 7.84 g. of zinc-copper couple. A nitrogen atmosphere was introduced followed by an iodine crystal and 60 ml. of ether. Freshly distilled methylene iodide (26.4 g., 8 ml.) was added in one portion and the mixture was heated with good stirring at 40° for 30 minutes. A solution of 6.42 g. of 3-isopropyl-2-cyclopentenol in 16 ml. of diethyl ether was added dropwise over 35 minutes. Heating was discontinued temporarily as the reaction was sufficiently exothermic to maintain reflux. After the addition was complete, the mixture was refluxed for one additional hour and after cooling, the reaction was treated with excess saturated aqueous ammonium chloride and filtered. The solid was washed well with diethyl ether and the resulting filtrate was washed with two portions of 10% aqueous sodium carbonate and brine. The aqueous layers were back extracted and the combined ether layers were washed with brine and dried over magnesium sulfate. Solvent removal yielded a yellow-green oil which was further purified by distillation.

This purified material exhibited B.P. 60° (1 mm.), $n_D^{25}$ 1.4655, $$\lambda_{max.}^{film} \ 3.00$$

9.49, 9.75$\mu$, n.m.r. signals at $\tau$5.55 (1H, multiplet, CHOH), 7.90 (1H, OH), 9.08 (3H, doublet, J=6 Hz., CHCH$_3$), 9.14 (3H, doublet, J=6.5 Hz., CHCH$_3$), 9.32 [1H, triplet, J(C-6-endo H, C-1H)=4.5 Hz., J(C-6-endo H, C-6-exo H)=4.5 Hz., C-6-endo H], 9.69 [1H, quartet, J(C-6-exo- H, C-1H)=7.7 Hz., J(C-6-endo H, C-6-exo H)=4.5 Hz., C-6-exo H]. Furthermore, the theoretical calculation for C$_9$H$_{16}$O: C, 77.09; H, 11.50 was compared with the actual found: C, 76.90; H, 11.60.

This information and a general knowledge of the entire synthetic process positively identified the product as demethyl-cis-sabinene hydrate.

When in the treatment of 2-methyl-3,6-heptanedione with a base and solvent, any of the corresponding bases and solvents listed in H. O. House, Modern Synthetic Reactions, W. A. Benjamin, Inc., New York (1965), page 185, are substituted on an equimolar basis for the sodium hydroxide and water-ethanol in the process of Example I substantially equivalent results are obtained in that comparative yields of demethyl-cis-sabinene hydrate are obtained. The only caveat is that the bases and solvents be compatible as shown in H. O. House, Modern Synthetic Reactions, supra, page 185.

When sodium borohydride, lithium borohydride or a lithium aluminum hydride-aluminum chloride mixture is substituted on an equimolar basis for the lithium aluminum hydride of the process of Example I substantially equivalent results are obtained in that comparative yields of demethyl-cis-sabinene hydrate are obtained.

When a dialkyl zinc compound, e.g., diethyl zinc, is substituted on an equimolar basis for the zinc-copper couple of Example I, substantially equivalent results are obtained in that comparative yields of demethyl-cis-sabinene hydrate are obtained.

EXAMPLE II

In a dry, 250 ml. flask, a solution of 4.62 g. of demethyl-cis-sabinene hydrate prepared in Example I in 75 ml. of acetone was oxidized at 0° with 9 ml. of chromium trioxide solution [prepared according to K. Bowden et al. J. Chem. Soc. 39 (1946)] over a 15-minute period. The resulting solution was stirred an additional 10 minutes at 0° and was then added to brine. Several ether extracts were washed with saturated aqueous sodium bicarbonate, the aqueous layers were back extracted, and the total ether was washed with brine and dried over magnesium sulfate. Removal of the solvent and distillation afforded 4.05 g. of a faint yellow oil which was further purified by distillation. Comparison of the physical constants, gas chromatographic retention time and infrared and nuclear magnetic resonance spectra of this material with an authentic sample positively identified the product as sabina ketone.

When manganese dioxide or a chromium trioxide-pyridine complex are substituted on an equimolar basis for the chromium trioxide in the process of Example II, substantially equivalent results are obtained in that comparative yields of sabina ketone are obtained.

EXAMPLE III

A dry 250 ml. flask fitted with a two-neck adapter, nitrogen inlet and septum was charged with 1.24 g. of a sodium hydride dispersion (61% sodium hydride in mineral oil). A nitrogen atmosphere was introduced and 40 ml. of dimethyl sulfoxide (distilled from calcium hydride) was added through the septum. The mixture was then heated at 70° for one hour, cooled to 0° and a solution of 11.9 g. of methyltriphenylphosphonium bromide in 40 ml. of dry dimethyl sulfoxide was added over 2 minutes at 0°. The semi-solid mixture was allowed to warm to room temperature in order to effect solution. This solution was stirred for 20 minutes at room temperature. A solution of 1.30 g. of sabina ketone from the process of Example II in 20 ml. of dry dimethyl sulfoxide was added dropwise over 5 minutes. The resulting dark yellow solution was stirred at room temperature for three hours and was added to water. The mixture was extracted with pentane. Several extracts were combined, washed with water, and brine, and dried over magnesium sulfate. The solvent was removed by distillation. Comparison of the physical constants, gas chromatographic retention time and infrared and nuclear magnetic resonance spectra of this material with an authentic sample positively identified the product as sabinene.

EXAMPLE IV

A dry 250 ml. flask fitted with a condenser and septum was maintained under a nitrogen atmosphere. The flask was charged with 37 ml. of a 1.62 M solution of methyl lithium (Alpha Inorganics) followed by 26 ml. of anhydrous ether. A solution of 2.94 g. of sabina ketone in 16 ml. of diethyl ether was added over 10 minutes and the resulting mixture was refluxed for one hour. After cooling, the colorless solution was decomposed by pouring onto excess ice. The mixture was extracted with diethyl ether. Several extracts were combined, washed with brine and dried over magnesium sulfate. Removal of the solvent afforded 3.30 g. of a faint green oil and analysis indicated 17% unknown (10% present in starting material), 13% trans-sabinene hydrate, 71% cis-sabinene hydrate, and 1% sabina ketone. Positive identification of the materials was made by chromatographic separation and subsequent determination of their infrared and nuclear magnetic resonance spectra. Their identity with published spectra positively confirmed the indicated structures.

When methyl magnesium chloride, methyl magnesium bromide, methyl magnesium iodide, methyl sodium and methyl potassium are substituted on an equimolar basis for the methyl lithium of Example IV substantially equivalent results are obtained in that comparative yields of cis-sabinene hydrate and trans-sabinene hydrate are obtained.

EXAMPLE V

Perfume compositions are prepared by intermixing the components shown below. These compositions all exhibit highly desirable and useful odors.

Composition A—Eau de cologne

| Component: | Percent by weight |
|---|---|
| Bergamot oil | 28.00 |
| Lemon oil | 28.00 |
| Orange oil sweet | 25.00 |
| Neroli oil bigar | 2.50 |
| Lavender oil | 3.00 |
| Rosemary oil | 2.50 |
| Demethyl-cis-sabinene hydrate | 8.00 |
| Benzyl acetate | .50 |
| Nerol | 1.00 |
| Hydroxycitronellal | .50 |
| Isoeugenol acetate | .50 |
| Musk ketone | .50 |
| | 100.00 |

Composition B—Hyacinth

| | Percent by weight |
|---|---|
| Phenyl acetaldehyde | 15.00 |
| Cinnamyl alcohol | 30.00 |
| Hyacinth absolute | 2.00 |
| Phenyl ethyl alcohol | 5.00 |
| Benzyl acetate | 5.00 |
| Rose oil bulg. | 2.00 |
| Heliotropin | 10.00 |
| Demethyl-cis-sabinene hydrate | 9.00 |
| Jasmin synthetic | 2.00 |
| Linalool | 10.00 |
| Iso eugenol | .90 |
| Musk ambrette | 1.00 |
| Terpineol | 7.00 |
| Galbanum resinoid | 1.00 |
| Violet leaf absolute | .10 |
| | 100.00 |

EXAMPLE VI

A conventional, granular, heavy-duty built detergent having the following composition is prepared:

| | Percent by weight |
|---|---|
| Sodium dodecyl benzene sulfonate | 20.0 |
| Sodium tripolyphosphate | 50.0 |
| Sodium silicate (SiO$_2$:Na$_2$O ratio 2:1) | 14.0 |
| Sodium sulfate | 14.0 |
| Water | 9.8 |
| Perfume Composition B of Example V | 0.2 |
| | 100.0 |

The detergent composition exhibits a highly desirable Hyacinth fragrance.

EXAMPLE VII

A conventional household soap bar having the following composition is prepared:

| | Percent by weight |
|---|---|
| Sodium soap | 75.0 |
| Potassium soap (The total soap comprises a mixture of 80% tallow soap and 20% coconut soap) | 7.5 |
| Water | 15.0 |
| Perfume Composition A of Example V | 2.5 |
| | 100.0 |

This soap bar exhibits a highly desirable eau de cologne fragrance.

EXAMPLE VIII

A spearmint flavor composition is prepared by intermixing the components shown below. This composition exhibits a highly desirable and useful flavor.

| | Percent by weight |
|---|---|
| α-Pinene | 1.0 |
| β-Pinene | 3.0 |
| Limonene | 15.0 |
| Cineole | 3.0 |
| 3-octanol | 2.0 |
| 3-octyl acetate | .5 |
| Demethyl-cis-sabnene hydrate | 2.0 |
| Menthane | 2.0 |
| Dihydrocarvone | 5.0 |
| Pulegone | 1.0 |
| Dihydrocarveyl acetate | 2.5 |
| Dihydrocarveal | 1.0 |
| Carvone | 60.0 |
| Carvyl acetate | 1.0 |
| Carveal | 1.0 |
| | 100.0 |

EXAMPLE IX

A conventional dentifrice suitable for use in caries prophylaxis is prepared having the following composition:

| | Percent by weight |
|---|---|
| Abrasive (particulate melamine-formaldehyde resin) | 30.00 |
| Sodium lauryl sulfate | 1.51 |
| Glycerine | 10.00 |
| Sorbitol | 20.00 |
| Hydroxyethylcellulose | 1.10 |
| Magnesium aluminum silicate | 0.40 |
| Saccharine | 0.12 |
| Flavor composition of Example VIII | 1.00 |
| Coloring | 0.47 |
| Water, balance to 100. | |

This dentifrice has a highly desirable spearmint flavor.

In addition to the preferred embodiments described herein, other arrangements and variations within the spirit and scope of the invention and the appended claims will occur to those skilled in the art.

What is claimed is:

1. Demethyl-cis-sabinene hydrate.

2. A process for the production of demethyl-cis-sabinene hydrate comprising the steps of:

(A) cyclizing 2-methyl-3,6-heptanedione with a base in a solvent wherein the base-solvent combination is selected from the group consisting of sodium hydroxide and ethanol and potassium hydroxide and a water-methanol mixture containing about 15% to about 50% methanol in an inert atmosphere to obtain 3-isopropyl-2-cyclopentenone, wherein the molar ratio of 2-methyl-3,6-heptanedione to base is from about 1:2 to about 5:1 and wherein the reaction temperature is in the range of about 35° C. to about 125° C.;

(B) reducing the 3-isopropyl-2-cyclopentenone with a reducing agent in a solvent to obtain 3-isopropyl-2-cyclopentenol wherein the reducing agent is selected from the group consisting of lithium aluminum hydride, sodium borohydride, lithium borohydride, and a lithium aluminum hydride-aluminum chloride mixture having a ratio of lithium aluminum hydride to aluminum chloride of about 0.9:1 to 1:0.9 and wherein the solvent is selected from the group consisting of diethyl ether, tetrahydrofuran and 1,2-dimethoxyethane when lithium aluminum hydride or said lithium aluinum hydride-aluminum chloride mixture is the reducing agent, and is selected from the group consisting of water and water-methanol mixtures when sodium borohydride or lithium borohydride is the reducing agent, and wherein the ratio of 3-isopropyl-2-cyclopentenone to reducing agent is from about 4:1 to about 1:1 and wherein the reaction temperature is from about −10° C. to about 40° C.; and (C) reacting the 3-isopropyl-2-cyclopentenol in an ether solvent and in an inert atmosphere with a mixture of methylene iodide and a compound selected from the group consisting of a zinc-copper couple and a dialkyl zinc compound, wherein the alkyl groups each contain 1 to 4 carbon atoms, to obtain the compound demethyl-cis-sabinene hydrate, wherein said mixture contains methylene iodide and the zinc-copper couple or dialkyl zinc compound in a molar ratio of methylene iodide to zinc-copper couple or dialkyl zinc compound of about 1:1.5 to about 1:1 and wherein said mixture is heated in an ether solution for from about 30 minutes to about 120 minutes at about 30° C. to about 50° C. prior to adding 3-isopropyl-2-cyclopentenol, and wherein the reaction between said mixture and 3-isopropyl-2-cyclopentenol is conducted at reflux temperature.

References Cited

Dauben et al., "J. Am. Chem. Soc.," vol. 85 (1963), pp. 468 to 472, Q01A51.

Winstein et al., "J. Am. Chem. Soc.," vol. 83, (1961), pp. 3235 to 3244, Q01A51.

Simonsen, "The Terpenes," vol. II, 2nd ed. (1949), pp. 16 to 23, Q0416S58.

BERNARD HELFIN, Primary Examiner

J. E. EVANS, Assistant Examiner

U.S. Cl. X.R.

99—140R; 252—109, 138, 522; 260—586R, 587, 594, 617R, 631.5, 657.5; 424—56